(12) United States Patent
Lefebvre

(10) Patent No.: US 7,762,167 B2
(45) Date of Patent: Jul. 27, 2010

(54) METHODS OF MODIFYING A TRAILER KINGPIN IN SITU

(76) Inventor: Richard M. Lefebvre, 4405 S. Xanthia St., Denver, CO (US) 80237

( * ) Notice: Subject to any disclaimer, the term of this patent is extended or adjusted under 35 U.S.C. 154(b) by 733 days.

(21) Appl. No.: 11/738,259

(22) Filed: Apr. 20, 2007

(65) Prior Publication Data
US 2008/0258429 A1 Oct. 23, 2008

(51) Int. Cl.
B23B 3/26 (2006.01)
B23P 17/04 (2006.01)

(52) U.S. Cl. .......................................... 82/128; 280/433

(58) Field of Classification Search .................. 82/117, 82/128, 130, 93, 104, 53.1; 29/401.1; 280/416.1, 280/433, 504, 515
See application file for complete search history.

(56) References Cited

U.S. PATENT DOCUMENTS 2,706,392 A * 4/1955 Lucas ........................... 70/232
4,286,799 A * 9/1981 Ayres ..................... 280/93.512
4,314,491 A * 2/1982 Hartmann et al. ............. 82/128
6,085,623 A * 7/2000 Lefebvre ...................... 82/128
6,220,617 B1 * 4/2001 Hunger ........................ 280/433
6,709,001 B1 * 3/2004 Morgan et al. .............. 280/421

* cited by examiner

*Primary Examiner*—Will Fridie, Jr.
(74) *Attorney, Agent, or Firm*—Ferdinand M. Romano; Beusse, Wolter, Sanks, Mora & Maire, P.A.

(57) ABSTRACT

A method of enlarging a kingpin which attaches a trailer to a fifth wheel on a tractor includes the step of providing a collar having a base, shank and head with the shank having a desired diameter. The collar also has an internal aperture having a first portion of a certain diameter and a second portion of lesser diameter. An existing kingpin is machined in situ on the trailer to a dimension commensurate with the internal apertures of the collar. The collar and machined kingpin are then joined to form a new kingpin having the desired diameter.

20 Claims, 5 Drawing Sheets

METHODS OF MODIFYING A TRAILER KINGPIN IN SITU

FIELD OF THE INVENTION

The invention in general relates to trailer kingpins and more particularly to a method of modifying a kingpin to provide a kingpin of different dimensions than the original.

BACKGROUND OF THE INVENTION

A kingpin is used to connect a trailer to a towing tractor. More particularly, the tractor carries a bearing like plate called a fifth wheel which has a slot. The kingpin includes a cylindrical base, a cylindrical shank and a cylindrical head, all of which extend through the floor of the trailer and engage the slot so that the tractor and trailer are coupled together. Thousands or tens of thousands of present coupling arrangements use a kingpin having a shank of a certain dimension.

An anti-jackknife assembly has been developed for tractor trailers. However to utilize such anti-jackknife assembly requires, for some applications, a kingpin with a shank dimension of greater diameter than the diameter of the kingpin in current use in those tractor trailers. To merely replace the smaller diameter kingpins with the larger diameter kingpins would require the removal of the welded in place kingpin and subsequent replacement, a costly, time consuming and labor intensive operation. The present invention solves the problem by resizing and enlarging the kingpin in situ without the requirement for removing it.

BRIEF DESCRIPTION OF THE DRAWINGS

The invention is explained in the following detailed description in view of the drawings briefly described as follows.

DETAILED DESCRIPTION OF EMBODIMENTS OF THE INVENTION

Figure 1A:
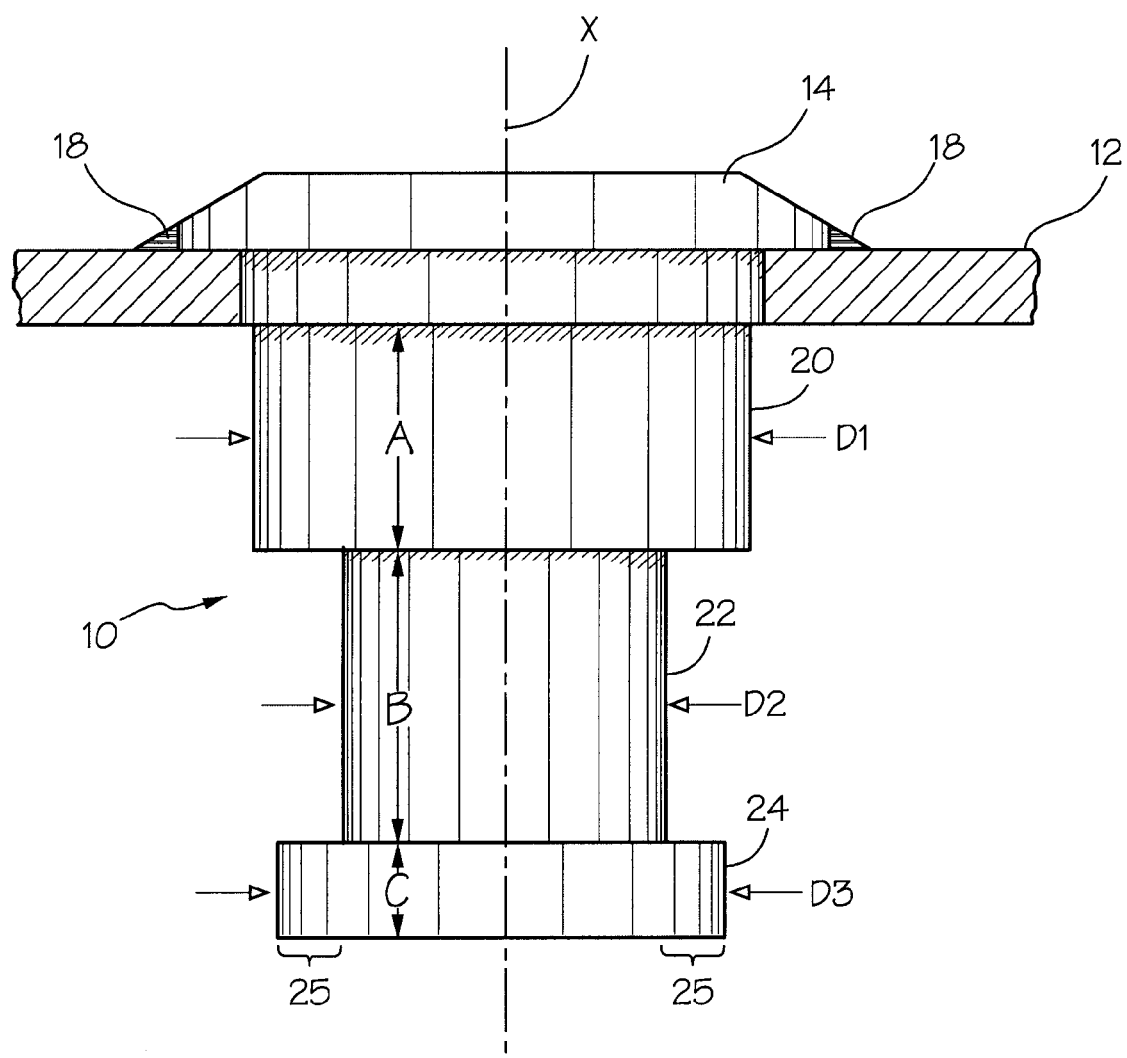
FIG. 1A is a view of an installed kingpin.

Referring now to FIG. 1A, there is illustrated an installed kingpin 10 which extends through a sub-floor 12 (also referred to by some in the art as a bolster plate) of a trailer and is symmetrical about a longitudinal axis X. Kingpin 10 includes an upper portion 14 which is welded to the sub-floor 12, as indicated by welds 18. Kingpin 10 includes a cylindrical base 20 having a diameter D1 and a longitudinal length of A, a cylindrical shank 22 having a diameter D2 and a length B and a cylindrical head 24 having a diameter D3 and length C, with the head 24 including a radially extending flange 25. In a kingpin in common use, the base has a diameter D1=2.875", the shank has a diameter D2=2.000" (50.8 millimeters) and the base has a diameter D3=2.812". These values are given by way of example and not by limitation. This is generally known as a 2 inch size of kingpin.

Figure 1B:
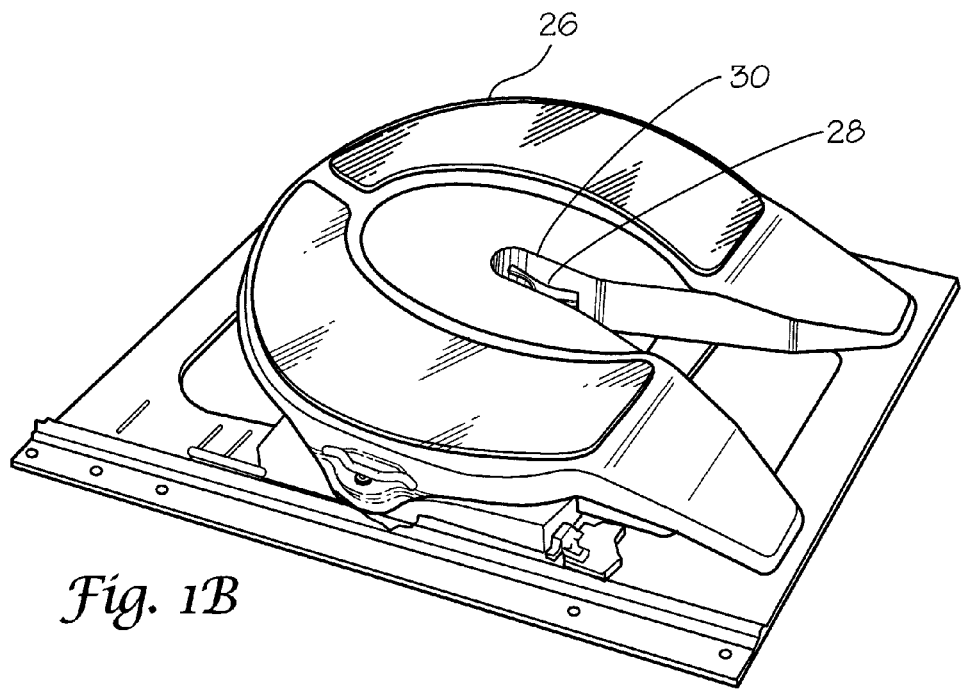
FIG. 1B is a view of a fifth wheel.

The kingpin is used to couple a trailer to a tractor of a tractor trailer arrangement, which tractor includes a fifth wheel, an example of which is illustrated in FIG. 1B. The fifth wheel 26 is a plate-like structure which includes a slot 28 into which the kingpin 10 (not shown in FIG. 1B) moves when the trailer and tractor are brought together. At the end of movement in the slot 28, the kingpin 10 will encounter a lock mechanism 30 to lock the kingpin in position.

Kingpins in the United States typically are of a two inch nominal size and of a 3.5 inch nominal size. While the 2 inch nominal size is most prevalent, and the 3.5 inch nominal size is usually provided only in trailers carrying relatively heavier loads, in some situations a trailer owner may wish to have a 3.5 inch rather than a 2 inch nominal size kingpin. Such a move up in size results in less wear on the kingpin and the fifth wheel of the tractor, and thus may provide longer useful life. Methods of the present invention provide for an in situ enlargement of an existing 2 inch kingpin to a 3.5 inch nominal size.

Also, an anti-jackknife assembly has been devised to prevent the trailer from jackknifing when driving on the highway. For certain tractor trailer combinations, in order to install such anti-jackknife assembly it is necessary that the kingpin have a shank which is of a certain larger diameter than the diameter of the existing kingpin. That is, the kingpins of certain trailers of such combinations have a shank with a diameter less than that required by the anti-jackknife assembly. To remove the welded kingpin and replace it with a kingpin with a shank of the requisite diameter is a time consuming, costly and labor intensive operation. The present invention also solves this problem.

Figure 2:
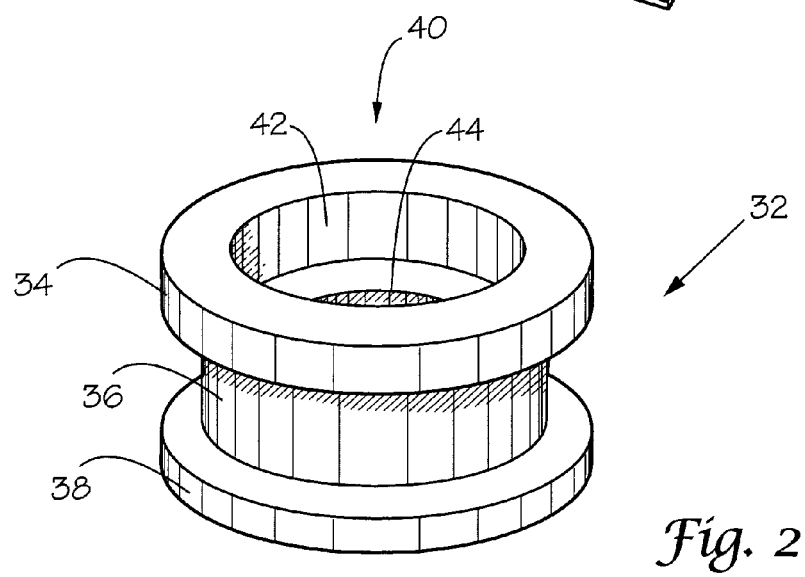
FIG. 2 is a perspective view of a collar used herein.

As part of the method to be described, use is made of a specialized sleeve or collar 32 as illustrated in FIG. 2. The collar 32 includes a base 34 of diameter D4, a shank of diameter D5 and a head of diameter D6. The collar 32 additionally includes a central aperture 40 having a first portion 42 of diameter D7 and a second, remaining portion 44 of smaller diameter D8. By way of example, and not to be limiting of the scope of the claims, D4=4.484", D5=3.5" (88.9 millimeters), the requisite dimension for use with the anti-jackknife assembly, and D6=4.375". This is generally known as a 3.5 inch size of kingpin.

In the present invention the existing kingpin is machined or ground in situ on the trailer to resize the base, shank and head by means of, for example an orbital lathe, such as described and claimed in U.S. Pat. No. 6,085,623, or by means of an orbital grinding device such as are known to those skilled in the art. Thereafter the collar is placed over the machined or ground down kingpin, in effect forming a new kingpin having a shank of a desired size, such as, for example, the proper size compatible with the anti-jackknife assembly. The process is illustrated in FIGS. 3 and 4.

Figure 3:
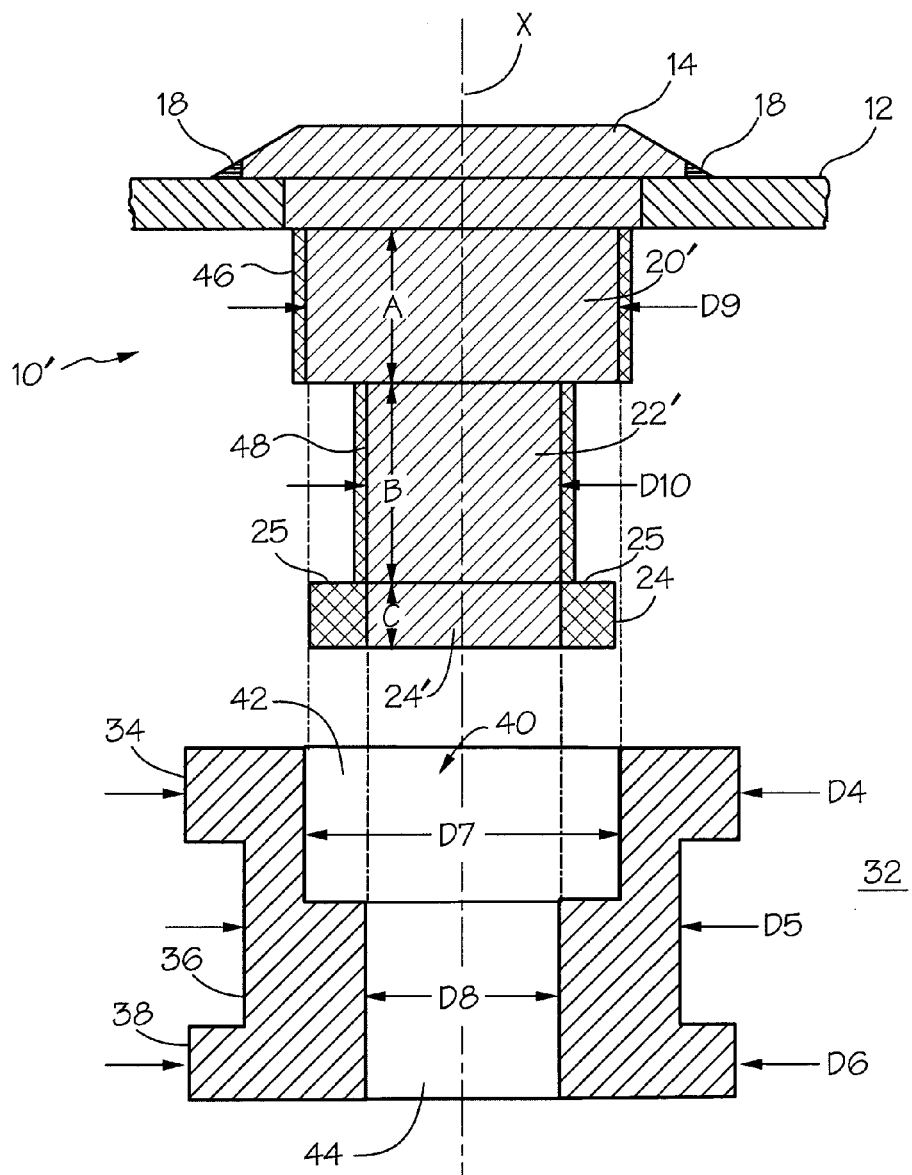
FIG. 3 is an exploded view of a kingpin and collar.
Figure 4:
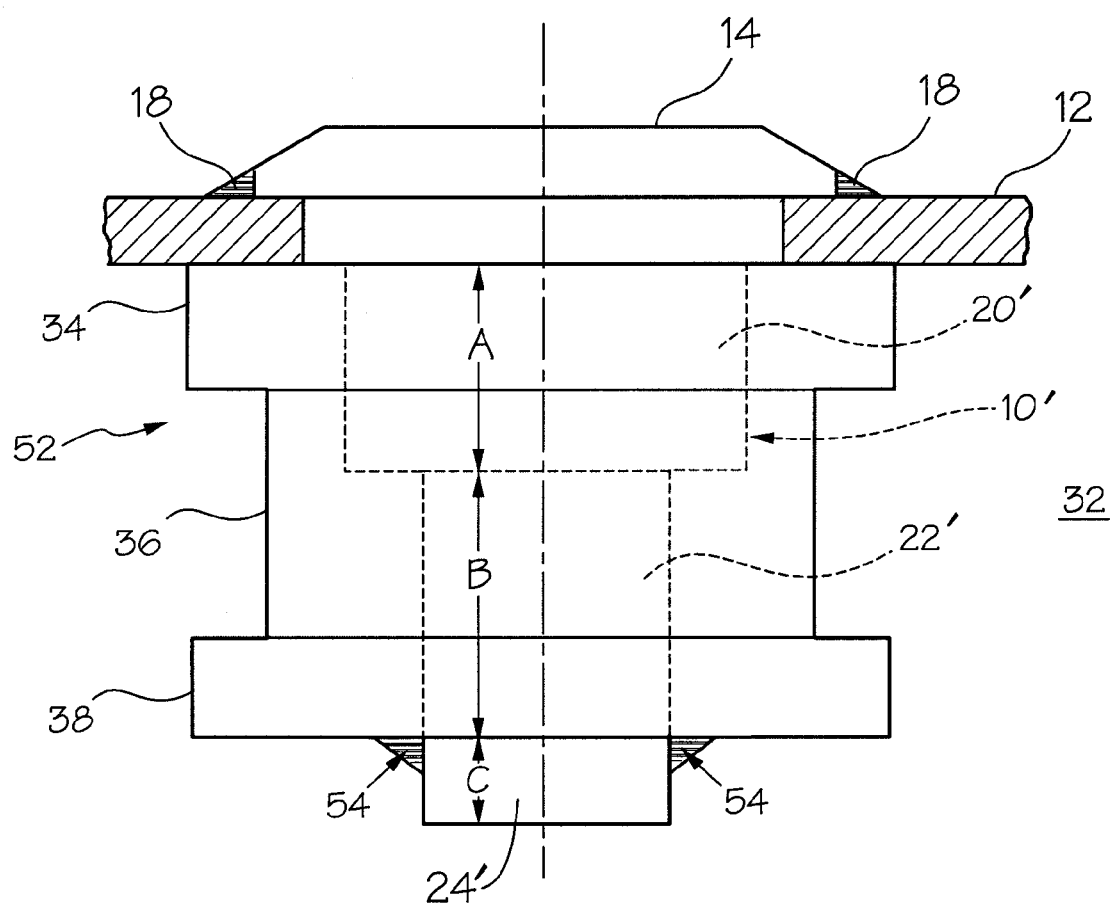
FIG. 4 is a view of collar attached to a kingpin.

FIG. 3 illustrates an exploded view, partially in section, of a machined kingpin, now designated as kingpin stub 10', along with a collar 32. The orbital lathe machining process (or orbital grinding device) resizes the original kingpin by removing a portion 46 from the base, which after the removal process is now indicated by the numeral 20'. The removed portions of material in FIG. 3 are indicated by the cross hatching. As shown there, portion 48 also is removed from the shank which after the removal is now indicated by numeral 22'. As part of the process, the flange portion 25 of former head 24 is removed, as is some additional material interior to the flange portion 25, leaving a core 24'. Thus, the kingpin stub 10' that remains after machining kingpin 10 (see FIG. 1A) comprises 20', 22' and 24', all of which have reduced diameters relative to the base 20, shank 22 and head 24 of the original kingpin 10. As exemplified in FIG. 3, the reduced diameter head 24' forms an extension to the likewise machined, reduced diameter shank 22' such that the resulting kingpin stub 10' may be considered to comprise a length of B+C having a uniform diameter, and, as will be illustrated in one exemplary embodiment, a portion of this may extend out the bottom of collar 32 after fitting the collar over the kingpin stub 10'.

The machining process is such that the reduced diameter shank 22' will fit into aperture 44 of collar 32 and the reduced diameter base 20' will fit into aperture 42 of collar 32. Thus nominally, diameter D9 will be substantially the same as D7 and diameter D10 will be substantially the same as D8. By way of example, with the previous dimensions given, D9 and D7=2.750", and D10 and D8=1.750". Further, in various embodiments, diameters D9 and D10 may be machined so as to ultimately be slightly larger than diameters D7 and D8, by, for example 0.002" (0.051 millimeters). The purpose of this is that if the diameters were the same size, it is potentially possible that the collar may slip off the kingpin stub (appreciating, however, that there may various approaches known in the art to practice the method with a relatively looser fit and an alternative fastening system employed). Further, the various embodiments noted the slight relative undersizing of diameters D7 and D8 relative to diameters D9 and D10, respectively, provides for a desired press-type fit when installation proceeds using particular steps described below for some embodiments.

That is, in order to obviate the potential problem of the machined kingpin coming loose from the collar 32, at least the slightly oversized machined down kingpin stub 10' is cooled prior to the joining of the kingpin and collar. This cooling reduces the size of the kingpin stub 10' so that it now will fit into the collar 32. When returned to ambient temperature the kingpin stub 10' will expand, so as to form a very tight forced fit with the collar 32. The previous cooling process may also be combined with a step comprising heating of the collar 32 so that it expands, thus allowing the kingpin stub 10' to easily fit into the aperture 40. Thus, when ambient temperature of the parts is attained, a very tight forced fit, comparable to a pressed fit, is achieved. As an alternative, the portions 42 and 44 of aperture 40 may be undersized by 0.002" with a proper fit being accomplished by the aforedescribed cooling, or, cooling and heating process. Also, it is noted that for some embodiments of the method of the present invention, one may only heat the collar 32, and not cool the kingpin stub 10'.

To achieve a desired relative sizing of the above-described components, in one embodiment, the first and second portions of aperture 40 are machined by means of a bench lathe at the site, the bench lathe being more precise than the orbital lathe. In this manner the relative oversizing or undersizing of the respective machined kingpin or collar 32 may be may be made with a desired accuracy.

FIG. 4 illustrates the new kingpin 52 having a shank diameter of 3.500" required for a particular anti-jackknife assembly. Reduced diameter head 24' of length C extends past the bottom of collar 32. In addition, in order to further ensure that the internal machined kingpin 10' and collar 32 remain securely connected, one or more spot welds 54 welding base 38 to kingpin stub 10' may be employed for this purpose.

Figure 5:
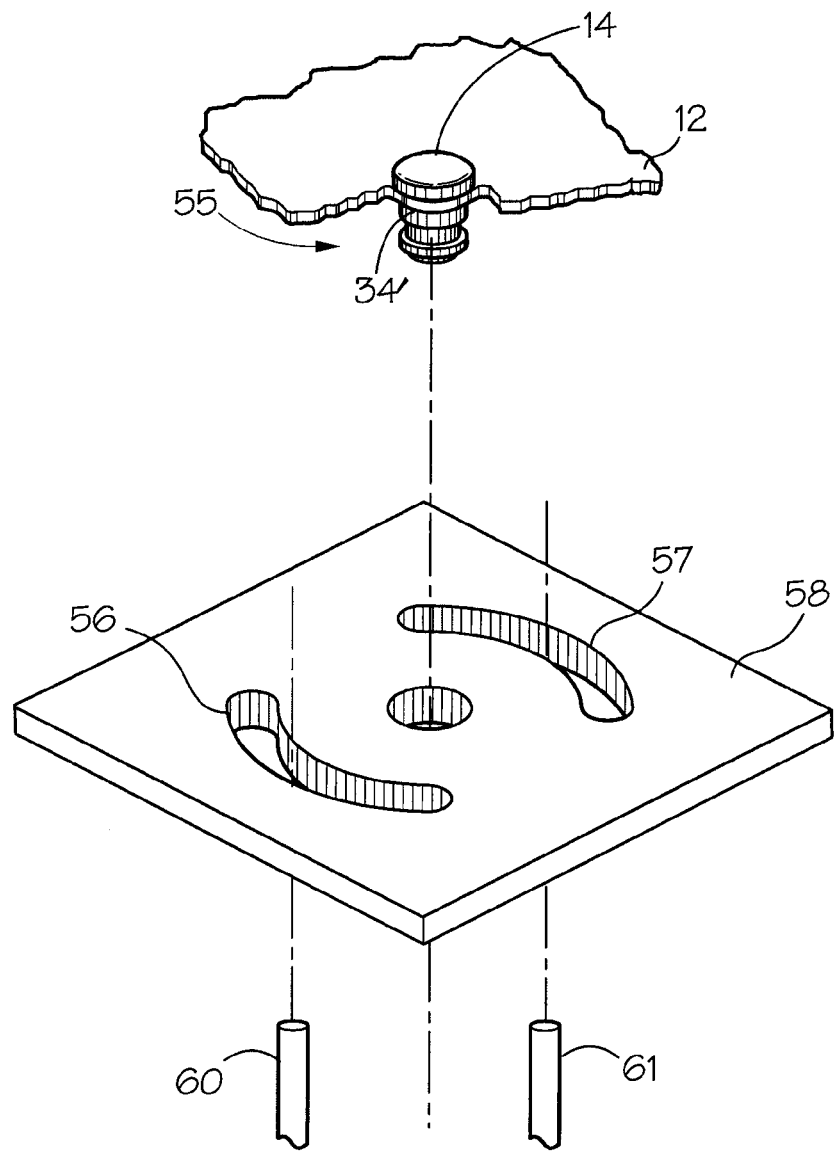
FIG. 5 is a view of an anti-jackknifing arrangement in relation to a kingpin.

As noted above, anti-jackknife devices and systems for trucks attached by kingpins and fifth wheels are known in the art. In one approach, laterally disposed pneumatically or hydraulically actuated pins are provided on a tractor in or to the side of the centered hole of the fifth wheel. For example, one pin to each lateral side may be provided in the fifth wheel, or close to the fifth wheel disposed further laterally to a lateral side of the tractor. A curved slot is provided in each trailer so as to align with each such pin. The curved slots may be provided directly in the structure of the trailer, such as the sub-floor 12 (FIG. 1), or they may be provided in one or more supplemental bolster plates that are welded or otherwise affixed to the underside of the trailer. Sub-floors may vary in thickness from 0.1875 to 0.75 inches, and for thinner sub-floors, the addition of a supplemental bolster plate may be advisable for proper functioning of the anti-jackknife system. Also, for various embodiments, as shown in FIG. 5, the kingpin 55 is centered in relation to two curved slots 56 and 57 in supplemental bolster plate 58, one to either side of the kingpin 55. In this regard the kingpin would be made having a collar of the requisite length so as to fit into the locking mechanism of the fifth wheel. The aforementioned pins 60 and 61 are retractable and are extendable to pass through respective curved slots 56 and 57.

During operation, when the tractor with trailer in tow has reached highway speeds, the pins 60 and 61 extend upward and the upper ends of the pins engage the respective curved slots 56 and 57. Should there be a rapid deceleration, such as due to a road hazard or other situation that could lead to a loss of control of the tractor with trailer in tow, the pins 60 and 61 remain in such upward, engaged position and as such, substantially reduce the chances of a jackknife event. This leads to improved safety. When not so engaged, the tractor is free to maneuver with tight turns, such as are needed in pick-up and delivery facilities.

It is appreciated that when a supplemental bolster plate is provided for installation of an anti-jackknife device portion for a trailer, the collar is selected or modified so as to have an additional length, above the base portion, to compensate for the thickness of the supplemental bolster plate. For example, if a one-inch thick supplemental bolster plate is utilized, then the base of the collar used for this installation may be elongated by one inch (compare 34 in FIG. 3 with 34' in FIG. 5). Also, in such applications, with an elongated collar, it is appreciated that the lower end of the kingpin stub may remain within the aperture of the collar, and one or more spot welds may be provided therein nonetheless.

While a method above has been described in regard to installation of an anti-jackknife device, the use of methods described and claimed herein is not meant to be so limited. That is, methods according to the present invention may be practiced for the purpose of modifying a trailer kingpin in situ, including enlarging it nominal size, unrelated to the steps that specifically pertain to an anti-jackknife device.

Also, it is appreciated that the exemplary embodiments described above are not meant to be limiting of the scope of the claims. For example, a collar need not have two portions of the interior aperture. Rather, it may have only one aperture which is machined to match the contours of the kingpin stub over which it is to be joined. Also, while the examples provided above demonstrate an enlargement of the nominal size of the kingpin, other applications are envisioned in which the method may be practiced so as to provide a new kingpin of the same, or of a smaller nominal size.

Also, the invention also includes kits that provide a collar and a supplemental bolster plate for installation onto a trailer so as to ready the trailer for use with an anti-jackknife device on a tractor. It is noted that the supplemental bolster plate may be relatively large—for instance, it may be five feet in length from front to back, and four feet in width from side to side. Nonetheless, kits may be provided, which may include detailed instructions and templates to assist with proper alignment of the supplemental bolster plate. Also, it is appreciated that although the supplemental bolster plate typically is installed after installation of the collar over the kingpin stub, this is not meant to be limiting. For example, and not to be limiting, in various embodiments the supplemental bolster plate may be installed onto the trailer after machining the original kingpin to a kingpin stub, and prior to joining the collar with the kingpin stub.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of enlarging a kingpin, the kingpin being installed in a floor of a trailer for a tractor trailer arrangement and having an upper portion secured in the trailer, and base, shank, and head portions extending outside the trailer, with the head portion including a radially extending flange, comprising the steps of:
providing a collar having base, shank, and head portions, with the shank having a desired diameter; and the collar including an internal aperture having a first portion of a certain diameter and a second portion of lesser diameter;
machining in situ kingpin material from the base portion down to a dimension substantially equal to the first portion, and from the shank and the head portions of the kingpin down to a dimension substantially equal to the second portion of the internal aperture of the collar, thereby forming a kingpin stub; and
joining the kingpin stub and the collar, resulting in a new kingpin having the desired diameter.

2. A method in accordance with claim 1 in which the step of machining in situ kingpin material comprises machining with an orbital lathe.

3. A method in accordance with claim 1 wherein the machining of the base portion brings its dimension, being a diameter, so as to be larger than the first portion of the internal aperture of the collar; and wherein the machining of the shank and head portions brings their dimensions, being diameters, so as to be larger than the second portion of the internal aperture of the collar.

4. A method in accordance with claim 3 which includes the steps of:
measuring the diameters of the machined base, shank and head to a desired accuracy;
machining the first portion of the internal aperture of the collar so as to be a first desired diameter that is smaller than the diameter of the machined base;
machining the second portion of the internal aperture of the collar so as to be a second desired diameter that is smaller than the diameters of the shank and the head.

5. A method in accordance with claim 4 wherein the first desired diameter and the second desired diameter are each 0.002 inches smaller than the diameters of the machined base and the machined shank and head, respectively.

6. A method in accordance with claim 4 which includes the step of:
cooling the kingpin stub prior to joining with the collar.

7. A method in accordance with claim 6 which includes the step of:
heating the collar prior to insertion of the kingpin stub into the collar for the joining.

8. A method in accordance with claim 1 which includes the step of:
spot welding the kingpin stub to the collar.

9. A method in accordance with claim 1 which includes the step of:
machining the first and second portions of the internal aperture of the collar with a bench lathe to achieve a desired fit.

10. A method of modifying a trailer kingpin comprising:
removing in situ kingpin material from an existing kingpin disposed on the trailer to desired dimensions to form a kingpin stub;
providing a collar comprising base, shank, and head portions, with the shank comprising a desired diameter, the collar including an internal aperture comprising one or more diameters;
measuring the desired dimensions of the kingpin stub;
machining the one or more diameters of the internal aperture to achieve a desired size relationship with the desired dimensions of the kingpin stub; and
joining the kingpin stub and the collar, resulting in a modified kingpin having the desired shank diameter.

11. A method in accordance with claim 10 in which the removing of the existing kingpin is with an orbital lathe or an orbital grinding device, and the machining of the one or more diameters of the internal aperture is with a bench lathe.

12. A method in accordance with claim 11, wherein the joining is achieved by cooling the kingpin stub prior to insertion into the collar, heating the collar prior to its insertion.

13. A method in accordance with claim 11 additionally comprising:
providing a supplemental bolster plate having thickness and a central aperture with curved slots on either side of the aperture; and
affixing the supplemental bolster plate onto a bottom surface of the trailer adjacent the modified kingpin in an aligned manner, wherein the curved slots are equidistant from the modified kingpin.

14. A method in accordance with claim 12, wherein the providing the collar includes the step of selecting or machining the collar to have an expanded length compensating for the thickness of the supplemental bolster plate.

15. An installation method for an anti-jackknife assembly portion to a trailer of a tractor trailer combination, comprising:
machining in situ kingpin material from an existing kingpin disposed on the trailer to desired dimensions to form a kingpin stub;
providing a collar having base, shank, and head portions, with the shank having a desired diameter, the collar including an internal aperture comprising one or more diameters;
measuring the desired dimensions of the kingpin stub;
machining the one or more diameters of the internal aperture to achieve a desired size relationship with the desired dimensions of the kingpin stub;
joining the kingpin stub and the collar, resulting in a modified kingpin having the desired shank diameter;
providing a supplemental bolster plate having thickness and a central aperture with curved slots on either side of the aperture; and
affixing the supplemental bolster plate onto a bottom surface of the trailer adjacent the modified kingpin in an aligned manner, wherein the curved slots are equidistant from the modified kingpin.

16. A kit comprising the collar and the supplemental bolster plate of claim 15.

17. An installation method according to claim 15, wherein the providing the collar includes the step of selecting or machining the collar to have an expanded length compensating for the thickness of the supplemental bolster plate.

18. An installation method according to claim 15, additionally comprising cooling the kingpin stub prior to the joining.

19. An installation method according to claim 15, additionally comprising heating the collar prior to the joining.

20. An installation method according to claim 15, additionally comprising cooling the kingpin stub and heating the collar prior to the joining.

* * * * *